(12) United States Patent
Abdeljaoued

(10) Patent No.: US 9,054,819 B2
(45) Date of Patent: Jun. 9, 2015

(54) SYSTEM TO IDENTIFY A USER OF TELEVISION SERVICES BY USING BIOMETRICS

(75) Inventor: Yousri Abdeljaoued, Ecublens (CH)

(73) Assignee: Nagravision S.A., Cheseaux-sur-Lausanne (CH)

(*) Notice: Subject to any disclaimer, the term of this patent is extended or adjusted under 35 U.S.C. 154(b) by 891 days.

(21) Appl. No.: 13/317,506

(22) Filed: Oct. 20, 2011

(65) Prior Publication Data

US 2012/0167124 A1 Jun. 28, 2012

Related U.S. Application Data

(60) Provisional application No. 61/426,546, filed on Dec. 23, 2010.

(30) Foreign Application Priority Data

Sep. 12, 2011 (EP) .................................. 11180961

(51) Int. Cl.
 *H04N 21/4415* (2011.01)
 *H04H 60/45* (2008.01)
 (Continued)

(52) U.S. Cl.
 CPC ........... *H04H 60/45* (2013.01); *H04N 13/0429* (2013.01); *H04N 21/42201* (2013.01); *H04N 21/4415* (2013.01); *H04N 21/44218* (2013.01)

(58) Field of Classification Search
 CPC ....... H04H 60/45; H04H 60/31; H04H 60/03; H04N 13/0429; H04N 21/44218; H04N 21/4415; H04N 21/42201
 USPC .......... 340/5.82, 5.52, 5.81, 5.74; 710/10, 11, 710/12, 13, 14; 382/117
 See application file for complete search history.

(56) References Cited

U.S. PATENT DOCUMENTS

| 4,695,879 A | 9/1987 | Weinblatt |
| 2005/0238194 A1 | 10/2005 | Chornenky |

(Continued)

FOREIGN PATENT DOCUMENTS

| EP | 0231427 | 8/1987 |
| EP | 1593964 A1 | 11/2005 |
| WO | WO 2007/100204 | 9/2007 |

OTHER PUBLICATIONS

European Search Report dated Sep. 17, 2012 issued in corresponding European Application No. 11180961.2.
Website: http://www.ruwido.com/products/voco-media/platform/.
Dass, Sarat C. et al. "Statistical Models for Assessing the Individuality of Fingerprints," IEEE Transactions on Information Forensics and Security, vol. 2, No. 3, pp. 391-401, Sep. 2007.

(Continued)

*Primary Examiner* — Nabil Syed
(74) *Attorney, Agent, or Firm* — Harness, Dickey & Pierce, P.L.C.

(57) ABSTRACT

A system to identify a user in relation with television services comprising eyeglasses worn by said user, said eyeglasses having a pair of flexible temples taking on the shape of a portion of the circumference of the user's head, a television receiver device comprising a server module communicating wirelessly with sensors arranged on the eyeglasses. The system is characterized in that each of the flexible temples of the eyeglasses incorporates at least one sensor configured for measuring a value of deflection caused by the temple bending around a portion of the circumference of the user's head, said value being unique for each user is transmitted as biometric to the server module configured for determining the identity of the user according to the measured value of the portion of the user's head circumference.

9 Claims, 2 Drawing Sheets

(51) Int. Cl.
*H04N 13/04* (2006.01)
*H04N 21/422* (2011.01)
*H04N 21/442* (2011.01)

(56) References Cited

U.S. PATENT DOCUMENTS

2006/0115130 A1 6/2006 Kozlay
2008/0244675 A1 10/2008 Sako et al.

OTHER PUBLICATIONS

Website: http://www.cyberglovesystems.com/products/cyberglove-ii/overview (2010).

Website: http://vicon.com/products/bonita.html (Aug. 31, 2011).

Website: http://sensorwiki.org.doku.php/sensors/flexion (Jun. 7, 2011).

Website: http://www.finger-motion-capture.com/applications.html (2009).

SYSTEM TO IDENTIFY A USER OF TELEVISION SERVICES BY USING BIOMETRICS

CROSS REFERENCE TO RELATED APPLICATIONS

This application claims priority under 35 U.S.C. Section 119 to U.S. Provisional Application No. 61/426,546, entitled "A system to measure the head circumference as a biometric" filed Dec. 23, 2010, and to European Patent Application EP 11180961.2 entitled "A system to identify a user of television services by using biometrics" filed Sep. 12, 2011, the contents of which are hereby incorporated by reference herein.

FIELD OF THE INVENTION

This invention relates to user identification for personalized services, targeted advertising, and audience measurement in the field of media broadcasting or Internet Protocol media streaming such as television program content.

TECHNICAL BACKGROUND

Several methods and devices for user identification based on biometrics are available to filter or to authorize users accessing value added services. For example:

EP1593964A1 discloses a biological sensor device including a sensor-mounting element worn on a portion from a front surface to a side surface of an upper part of a face of a user; and a plurality of biological sensors that is installed on the sensor-mounting element and that measures different types of biological conditions of the user. In the biological sensor device, a plurality of biological sensors for measuring different types of biological conditions, such as an electromyography sensor and a temperature sensor, a temperature sensor and a vibration sensor, or a vibration sensor and a blood flow sensor is installed on the sensor-mounting element. Thus, by analyzing the plurality of different types of biological conditions acquired by the plurality of biological sensors, the psychological state of the user who views or listens to content can be estimated and determined.

US2006/115130A1, disclose an eyewear display system, which provides effective means for biometrically authenticating pre-enrolled users thereto. The eyewear display system integrates a biometric sensor that can determine the identity of the wearer who seeks to access image and/or audio data that is secured, sensitive, or otherwise subject to security controls, restrictions, and limitations on usage and viewing. The system may include a biometric authentication module with an embedded iris scanner subsystem or may implement fingerprint scanning. The system is also able to detect the presence or absence of a user. More specifically, the eyewear display system can sense the appearance of a prospective user, so that user can be prompted by the system for authentication. Conversely, when the eyeglasses are removed from the user's head, the system can detect this event and terminate the transmission of sensitive images from the signal feed source to the display. A proximity sensor can be implemented as a mechanical switch coupled to the body of the eyeglasses to sense the motion of a spring-hinged temple (ear-piece) when the frame is spread to place it on the user's head. This switch would have an operating position and a non-operating position, wherein the member is in the non-operating position in the absence of the user from the eyeglass frame and the switch is moved to the operating position when the user has placed the eyeglass frame on his or her head. Alternatively, the proximity detector may be electronic and may include a semiconductor device. The presence sensing mechanism may be optical, such as an infrared (IR) reflection detector, or acoustic, such as a high-frequency sonic range detector. Another example of a presence detection mechanism is the detection of the presence or absence of an iris image obtained from a silicon photo-detector array.

US2005/238194A1 discloses a human-machine interface which can detect when a user's ear is pulled back to initiate a plurality of procedures. Such procedures include turning on a TV using a laser attached to the user, starting an additional procedure by speaking a command, communicating with other users in environments which have high ambient noise, and interacting with the internet. Head position sensors are used to detect the position of the head of a user and to either initiate a procedure if a characteristic of the head position or positions meets a certain criteria, or to pass the head position information to another device. A transmitting apparatus having a sensor for detecting an ear pull of a user and a laser worn by the user. An electronic module is coupled to both the ear pull sensor and the laser and generates a laser beam upon detection of the ear pull. The ear movement sensors may be based on capacitance changes between plates located on the body of the user and on the frame of the eyeglasses. Also, the ear movement can be detected by detecting a change in the magnitude of an RF field or a magnetic field using a detector in an electronic module located in an ear clip. Also the resistance of the user's skin proximate to the ear would change sufficiently to detect an ear movement. A strain gauge together with an electronic module detects the change of the strain in the temple piece when the ear is pulled back. When the ear movement is detected, the electronic module connected to a laser generator by wires hidden behind or inside the temple piece of the glasses, causes the laser to send the predetermined code which activates a sensor to turn on or turn off the TV set. The transmitting apparatus for a user which has a plurality of sensors for detecting a head position of the user, a RF transmitter and an electronic module coupled to the plurality of sensors and to the RF transmitter. The electronic module generates an encoded RF signal containing information about the head position of the user.

Problem to be Solved

The identification of a user within the context of television viewing in a household is necessary to enable the attractive personalized television services. The current techniques are not suited due to several reasons. The lean back attitude of the viewer makes the collaborative scenario—the user participates actively in the biometric measurement process—not feasible. For instance the user is not willing to scan a fingerprint [1] or look towards a camera for the acquisition of a frontal face image. Additionally, the use of conventional biometrics within a household, commonly constituted of few persons, is overkill. The individuality of fingerprint is suited for millions of persons as has been demonstrated in [2]. A simple biometric in a non-collaborative scenario is more likely to be adopted by the user.

SUMMARY OF THE INVENTION

Eyeglasses are essential to perceive the depth in a stereo three dimensional (3D) content. Currently, it is the most widely used display technology with 3D television. Due to technical obstacles, auto-stereoscopic and holographic displays are not mature to be deployed. Eyeglasses are also used as a display for augmented reality to overlay information and graphics on the real scene. Eyeglasses could constitute an interesting platform to integrate a multitude of sensors for different applications, in particular for biometric measurements.

An aim of the present invention is to propose an efficient system using a process of biometric measurements without user voluntary participation. This aim is achieved by a system to identify a user in relation to television services comprising eyeglasses worn by said user said eyeglasses having a pair of flexible temples taking on the shape of a portion of the circumference of the user's head, a television receiver device comprising a server module communicating wirelessly with sensors arranged on the eyeglasses, the system is characterized in that each of the flexible temples of the eyeglasses incorporates at least one sensor configured for measuring a value of deflection caused by the temple bending around a portion of the circumference of the user's head, said value being unique for each user is transmitted as biometric to the server module configured for determining the identity of the user according to the measured value of the portion of the user's head circumference.

The circumference of a head is a simple biometric which fulfils the uniqueness requirement when considering a household with a limited number of persons. Typically, in a household the head circumferences of the members are different so as children with a small head circumference cannot access to television programs for adults.

By integrating bend sensors in the flexible arms also called temples of the eyeglasses, it is possible to identify the different members of a household. The bend sensors measure the amount of deflection caused by bending the sensor. The measurement is sent wirelessly to the server module integrated for example in a set-top box for the user identification. The communication between the eyeglasses and the server module may be established through protocols using infra-red or radio frequency transmissions.

BRIEF DESCRIPTION OF THE DRAWINGS

The invention will be better understood with the following detailed description, which refers to the attached figures given as non-limitative examples.

DETAILED DESCRIPTION OF THE INVENTION

Bend sensors have been already integrated in gloves to measure the joint angle of a hand for virtual reality applications [3].

In a first embodiment of the present invention a bend sensor BS may be integrated in the temples T of eyeglasses EG to measure a portion of the head H circumference. The temples T are curved to take on the exact shape of a portion of the circumference of the user's head H. The sensor BS produces a measurement value varying proportionally to the amount of the deflection of the temples T.

There are three most common types of bend sensors BS, cf. [5]:

a) Conductive ink-based sensor which electrical resistance changes depending on the amount of deflection on the bend sensor. These types of bend sensors are passive resistive devices typically fabricated by laying a strip of resistive ink on a flexible plastic substrate, shaped as a thin, flexible stripe in lengths between 1" and 5". At rest (when laid flat), the bend sensor is characterized by an intrinsic resistance. As the sensor is bent, the resistive materials inside it are pulled further apart. Fewer adjacent resistive particles come into contact, thereby increasing the resistance. Typically, the nominal resistance range is between $10\,k\Omega$ and $50\,k\Omega$ and increases by a factor of 10 at full deflection. The resistance can be converted into a voltage.

b) Fiber-optic based sensor which light conductivity varies with the deflection amount. These sensors also called optical goniometers consist of a light source, a plastic optical fiber (POE) with an abraded section and a photosensitive detector. Light is emitted into the POF at one end and sensed at the other end. Bending the optical fiber results in a loss of light intensity. The loss of light is often enhanced by cutting, polishing or abrading a part of the POF. Due to the sensing principle single fiber-optical bend sensors are unipolar devices. A bend sensor can also be made from a length of fiber optic cable with a LED and a photodiode placed at both ends of a section of cable.

c) Conductive fabric, thread, or polymer-based sensor which electrical conductivity varies with the deflection amount. They typically consist of two layers of conductive material with a layer of resistive material (e.g. Velostat) in between. It is mostly sandwiched in between layers of more rugged material, e.g. Neoprene. As pressure is applied (directly or by bending) the two layers of conductive material get pushed closer together and the resistance of the sensor decreases. This sensing mechanism is similar to force-sensitive resistors. Strictly speaking, these types of sensors are pressure sensors which also sense deflection (pressure as a function of deflection): bending the sensor across an angle of a rigid structure results in stretch of the sensor material which exerts pressure onto the sensor. It is this pressure that is measured. Foam/Polymer-based sensors decrease their nominal resistance as the material is compressed.

Figure 1:
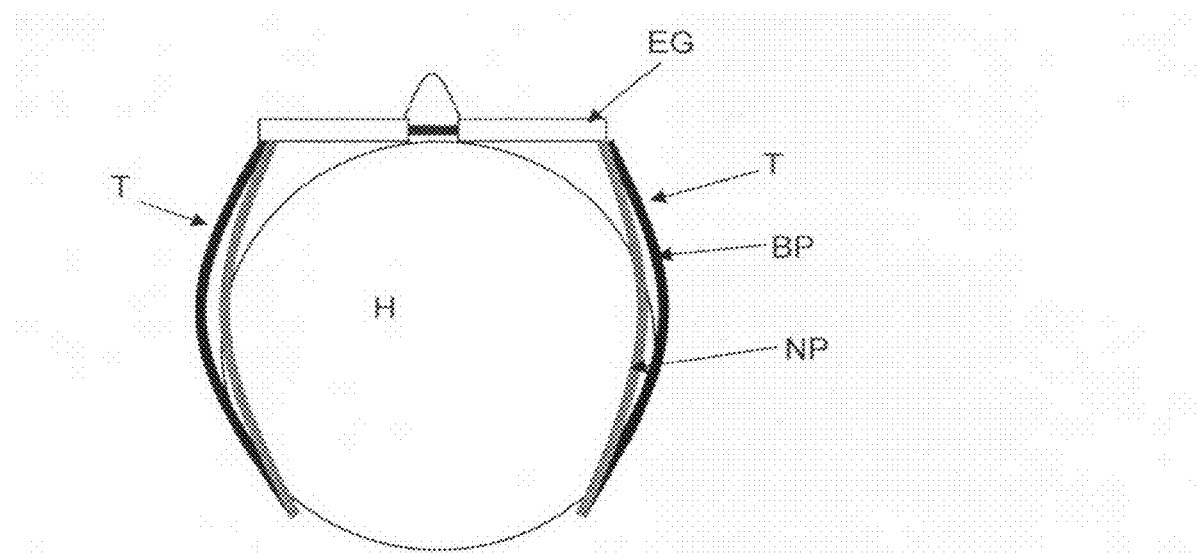
FIG. 1 shows a first embodiment of the invention where the eyeglasses comprise bend sensors incorporated in the temples for measuring a portion of the user's head circumference.

FIG. 1 illustrates the difference of the bend of flexible temples T of eyeglasses EG between a neutral position NP and a bend position BP when the eyeglasses EG are worn on a head H by adapting on a portion of the head's circumference.

The preferred type of bend sensor BS is the one based on fiber-optic which appears to have the required precision and the right form factor to be considered [5], [6].

According to a second embodiment, the circumference of a head H is measured by using optical sensors OS as bend sensors BS similar to motion capture systems.

Figure 2:
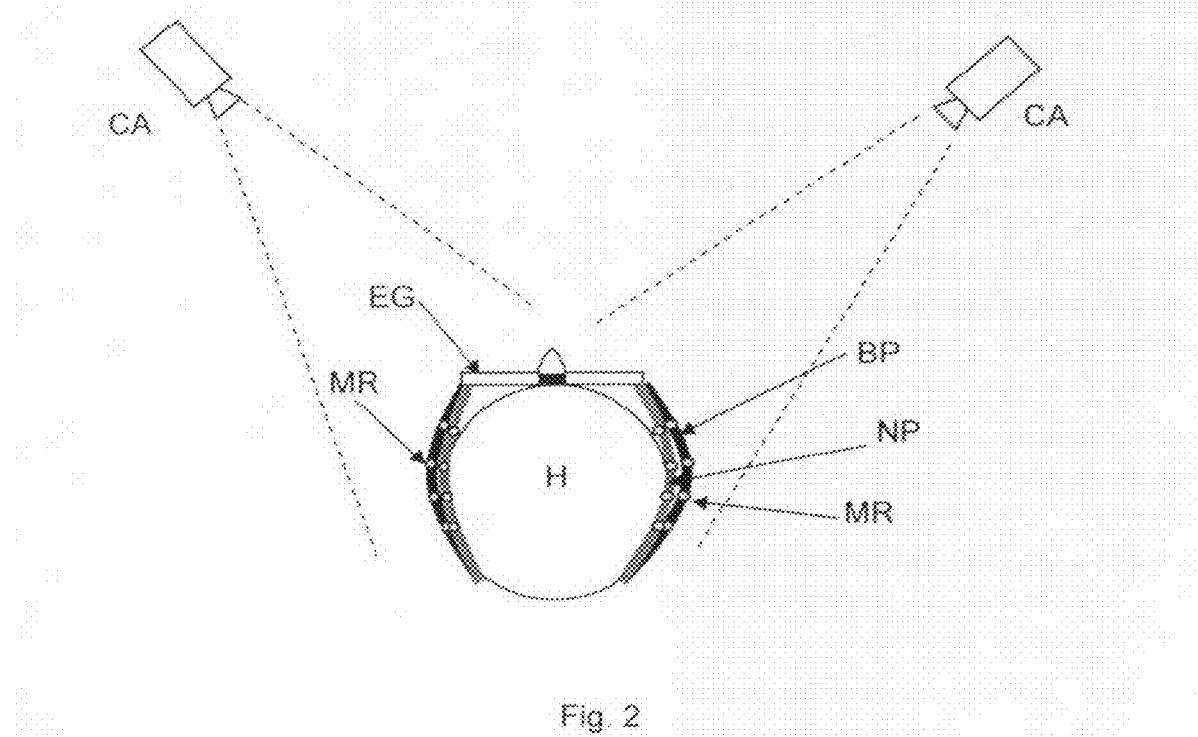
FIG. 2 shows a second embodiment of the invention where the eyeglasses comprise temples with optical sensors allowing cameras to measure positions of markers along the temples, these positions varying according to the user's head circumference.

Light reflective markers MR are attached to the flexible temples T of the eyeglasses EG and aligned preferably at regular intervals along the length of the temple T. When the eyeglasses EG are worn, the temples T are bent to fit the shape of a portion of the circumference of the viewer's head H. In this way the positions of the markers change accordingly (see FIG. 2). At least one camera CA is arranged near the location of the user to acquire the biometrics by measuring the value of the deflection of the temples T through position variations of the markers MR between a neutral position NP and a bend position BP determined by the head circumference. The neutral position NP is defined by the position of the markers MR when the eyeglasses EG are put off from the user's head H. In this embodiment, the measurements values are transmitted wirelessly WTx to the server module SM from the camera CA instead from the temples T of the eyeglasses EG. Two or more cameras CA allow improving precision of the measurements whatever the location of the user's head H in the field of view of the cameras CA.

The motion capture systems are becoming more and more affordable [4] so that in the near future, they will be easily available for consumers in the home. Additionally the motion capture system could allow measuring the activities of the user at home. For example by placing markers on the different screens (e.g. tablet PC, TV screen, or laptop), a cross-platform audience measurement to determine which screen is currently watched by the viewer could be achieved.

Figure 3:
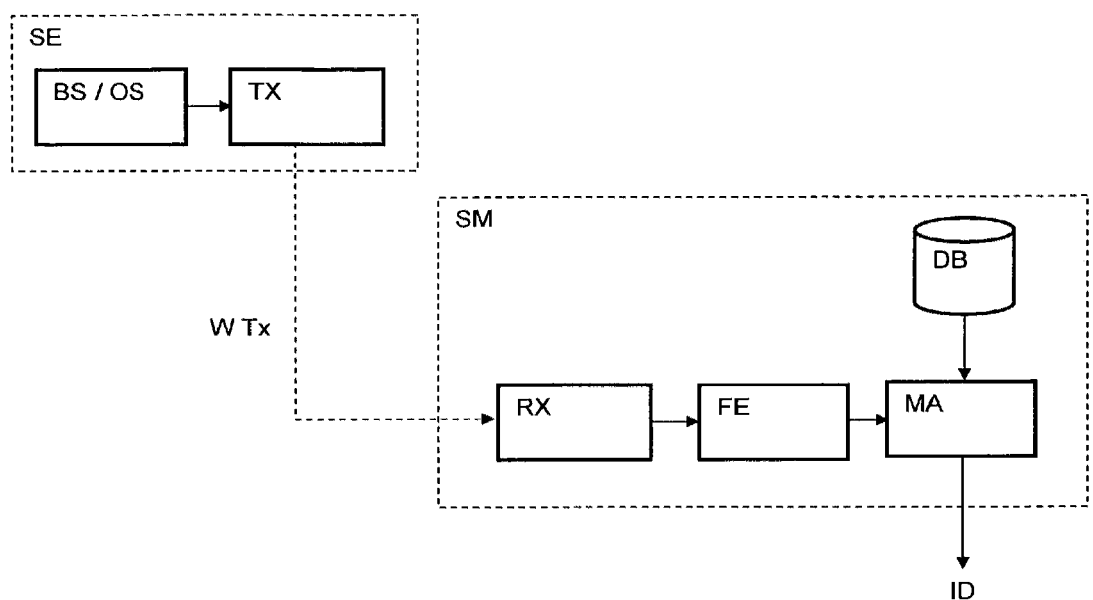
FIG. 3 shows a functional block diagram of a biometric system based on head circumference measurement. The system includes a sensor transmitting measurement values to a server module incorporated in a television receiver device.

FIG. 3 illustrates a typical functional block diagram of a biometric system based on head circumference measurement. The system includes a sensor SE transmitting wirelessly WTx measurement values to a server module SM generally integrated in the television receiver device.

In the first embodiment the sensor SE includes a bend sensor BS and a transmitter TX located in each temple T of the eyeglasses EG.

In the second embodiment the sensor SE includes an optical sensor OS made up of the markers MR on the temples T and at least one camera CA equipped with a transmitter TX watching the eyeglasses temples T.

The server module SE comprises a receiver RX connected to a feature extraction module FE which is connected to a matcher module MA using an enrollment database DB. The feature extraction module FE serves to estimate a set of features to identify the user. For example, the received measurement values are averaged over a period of time in order to reduce parasitic effects due to transmission errors, interferences or noise.

The enrollment database DB contains reference templates, i.e. a set of features which are discriminative for a specific individual. The enrolment is performed during an initialization phase when a user decides to register in the biometric system.

The matcher module MA is provided with means to compare the set of features extracted from the received measurement values produced by the sensor SE by the feature extraction module FE with the reference templates recorded in the enrolment database DB to establish the identity ID of the user. Only users identified by the biometric system i.e. registered in the database DB and recognized by the system as legitimate users can thus access to the television services while non registered users have only a limited access or no access at all to the same services.

One of the main advantages of this biometric system is the non-collaborative aspect to identify the user. This aspect is important in the context of the general lean back attitude of television viewers. In addition to that, eyeglasses will be more and more used in potential applications such as 3DTV and augmented reality. In conjunction with the alternate frame sequencing technology (i.e. subdividing one period into several video sub-channels), the proposed biometric system can be used for the following potential applications:

Targeted advertising: The goal of TV operators and advertisers is to reach the right viewer with the right marketing message. The granularity of current TV advertising solutions is the household. The identification of a specific viewer allows having a finer granularity. In this way, advertisements could be adapted to the viewer's profile (age, gender, etc). For example, an adult can watch a car advertisement while a young person can receive a game advertisement.

Rating-based adapted content: several versions of a video content can be watched by different viewers at the same time. A movie could be adapted to the viewer's sensibility with respect to violence and sex.

Personalized 3DTV experience: by integrating different sensors (e.g. magnetic, optical, inertial sensors) in the shutter glasses, the pose of the TV viewer's head can be estimated and transmitted to the decoder. If multiple synchronized video signals as well as multiple depth maps are available at the encoder side, intermediate stereo pairs, which correspond to the position of the user's head, can be generated at the decoder side. The decoding utilizes the position provided by the shutter glasses. This system allows the user to have an immersive TV experience. In addition of the pose of TV viewer's head, the baseline and the depth (young TV viewers prefer more depth than old ones) can be adapted to the user.

TV audience measurement: accurate audience measurement matters more than ever for network operators, advertisers, and programmers to deploy addressable advertising. Current rating systems, such as Nielsen ratings, are based on personnel diaries and people meter technology. Since these systems are flawed, network operators have started making use of data collected from the set-top-boxes to gain insights into the second-by-second viewing habits of millions of TV viewers.

The identification of the user by the eyeglasses allows establishing the link between the collected data and the viewer. In the case of marker-based eyeglasses, markers could be attached to different screens of media viewing platforms, such as the TV screen, the personal computer PC monitor, the tablet PC or other viewing devices. The server estimates the positions of the different screens and the head pose of the users. Therefore the server can identify the screen currently watched by each user. This system allows thus cross-platform audience measurement, a feature which is urgently needed by network operators for the emerging trend of three-screen viewing.

REFERENCES

[1] Ruwido remote control integrating a fingerprint scanner: http://www.ruwido.com/products/voco-media/platform/
[2] Y. Zhu, S. C. Dass and A. K. Jain, "Statistical Models for Assessing the Individuality of Fingerprints", IEEE Transactions on Information Forensics and Security, Vol. 2, No. 3, pp. 391-401, September 2007
[3] CyberGlove II: http://www.cyberqlovesystems.com/products/cyberqlove-ii/overview
[4] Vicon Bonita motion capture system: http://www.vicon.com/products/bonita.html
[5] Fiber optic bend sensors http://sensorwiki.org/doku.php/sensors/flexion
[6] Fiber optic finger motion capture http://www.finger-motion-capture.com/applications.html

The invention claimed is:

1. A system to identify a user in relation with television services, the system comprising:
   eyeglasses worn by said user, said eyeglasses having a pair of flexible temples taking on the shape of a portion of the circumference of the user's head, and
   a television receiver device comprising a server module configured to communicate wirelessly with sensors arranged on the eyeglasses, wherein each of the flexible temples of the eyeglasses incorporates at least one sensor configured for measuring a value of deflection caused by the flexible temples bending around a portion of the circumference of the user's head, said value being unique for each user and being transmitted as a biometric to the server module configured for determining the identity of the user according to the measured value of the portion of the user's head circumference.

2. The system according to claim 1, wherein the at least one sensor is made up of a bend sensor and of a transmitter incorporated in each of the flexible temples of the eyeglasses, said bend sensor producing measurement values corresponding to the temple deflection, said values being transmitted wirelessly by the transmitter to the server module.

3. The system according to claim 2, wherein the bend sensor is a conductive ink-based sensor which electrical resistance changes depending on the amount of deflection on the bend sensor.

4. The system according to claim 2, wherein the bend sensor is a fiber-optic based sensor which light conductivity varies with the amount of deflection on the bend sensor.

5. The system according to claim 2, wherein the bend sensor is conductive fabric, thread, or polymer-based sensor which electrical conductivity varies with the amount of deflection on the bend sensor.

6. The system according to claim 1, wherein the at least one sensor is made up of an optical sensor comprising light reflective markers attached to the flexible temples of the eyeglasses and aligned along the length of the flexible temples, and of at least one camera arranged near the location of the user's head acquiring the biometric by measuring the value of deflection of the flexible temples through position variations of the markers determined by the user's head circumference, said value being transmitted wirelessly to the server module by a transmitter included in the camera.

7. The system according to claim 6, wherein the position variations of the markers on the flexible temples are determined between a neutral position and a bend position determined by the user's head circumference, the neutral position being defined by the position of the markers when the eyeglasses are put off from the user's head.

8. The system according to claim 6, wherein the optical sensor further comprises light reflective markers attached to screens of media viewing platforms watched by the user wearing the eyeglasses having optical markers on the flexible temples, the server module being configured to perform audience measurement by estimating a position of the screens and user's head pose and identifying the screen currently watched.

9. The system according to claim 1, wherein the server module comprises a receiver connected to a feature extraction module which is connected to a matcher module using an enrollment database, the matcher module being configured to compare a set of features extracted from the received measurement values produced by the sensor by the feature extraction module with reference templates recorded in the enrollment database to establish the identity of the user.

* * * * *